(12) United States Patent
Illikkal et al.

(10) Patent No.: US 7,991,956 B2
(45) Date of Patent: Aug. 2, 2011

(54) PROVIDING APPLICATION-LEVEL INFORMATION FOR USE IN CACHE MANAGEMENT

(75) Inventors: Rameshkumar Illikkal, Portland, OR (US); Ravishankar Iyer, Portland, OR (US); Li Zhao, Beaverton, OR (US); Donald Newell, Portland, OR (US); Carl Lebsack, Ames, IA (US); Quinn A. Jacobson, Sunnyvale, CA (US); Suresh Srinivas, Portland, OR (US); Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 981 days.

(21) Appl. No.: 11/823,325

(22) Filed: Jun. 27, 2007

(65) Prior Publication Data

US 2009/0006755 A1    Jan. 1, 2009

(51) Int. Cl.
*G06F 12/00* (2006.01)

(52) U.S. Cl. . 711/118; 711/133; 711/141; 711/E12.016; 711/E12.026

(58) Field of Classification Search .......... None
See application file for complete search history.

(56) References Cited

U.S. PATENT DOCUMENTS

| | | | | |
|---|---|---|---|---|
| 6,360,299 | B1* | 3/2002 | Arimilli et al. | 711/137 |
| 6,990,557 | B2 | 1/2006 | Hokenek et al. | |
| 7,496,716 | B2* | 2/2009 | Dice et al. | 711/147 |
| 2005/0114605 | A1* | 5/2005 | Iyer | 711/133 |
| 2006/0143390 | A1* | 6/2006 | Kottapalli | 711/130 |
| 2007/0006230 | A1* | 1/2007 | Neiger et al. | 718/100 |
| 2008/0016278 | A1 | 1/2008 | Clark et al. | |
| 2008/0022049 | A1* | 1/2008 | Hughes et al. | 711/130 |
| 2008/0133842 | A1 | 6/2008 | Raikin et al. | |
| 2008/0195849 | A1 | 8/2008 | Gonzalez et al. | |
| 2009/0089564 | A1 | 4/2009 | Brickell et al. | |

OTHER PUBLICATIONS

U.S. Appl. No. 11/503,633, filed Aug. 14, 2006, entitled "Providing Quality of Service (QoS) for Cache Architectures Using Priority Information," by Li Zhao, et al.
U.S. Appl. No. 11/527,222, filed Sep. 25, 2006, entitled "Quality of Service Implementation for Platform Resources," by Ramesh G. Illikkal, et al.
U.S. Appl. No. 11/705,987, filed Feb. 14, 2007, entitled "Cache Sharing Based Thread Control," by Jaideep Moses, et al.
U.S. Appl. No. 11/786,019, filed Apr. 9, 2007, entitled "Priority Based Throttling for Power/Performance Quality of Service," by Ramesh Illikkal, et al.
U.S. Appl. No. 11/726,238, filed Mar. 21, 2007, entitled "Dynamic Quality of Service (QoS) for a Shared Cache," by William C. Hasenplaugh, et al.

(Continued)

*Primary Examiner* — Reginald G Bragdon
*Assistant Examiner* — Aracelis Ruiz
(74) *Attorney, Agent, or Firm* — Trop, Pruner & Hu, P.C.

(57) ABSTRACT

In one embodiment, the present invention includes a method for associating a first identifier with data stored by a first agent in a cache line of a cache to indicate the identity of the first agent, and storing the first identifier with the data in the cache line and updating at least one of a plurality of counters associated with the first agent in a metadata storage in the cache, where the counter includes information regarding inter-agent interaction with respect to the cache line. Other embodiments are described and claimed.

17 Claims, 4 Drawing Sheets

OTHER PUBLICATIONS

U.S. Patent and Trademark Office, Office Action mailed Oct. 4, 2010 with Reply filed on Jan. 4, 2010 in U.S. Appl. No. 11/998,902.

U.S. Patent and Trademark Office, Notice of Allowance mailed Feb. 16, 2011 in U.S. Appl. No. 11/998,902.

* cited by examiner

PROVIDING APPLICATION-LEVEL INFORMATION FOR USE IN CACHE MANAGEMENT

BACKGROUND

In today's computer systems, an operating system (OS) and a virtual machine monitor (VMM) (when present) monitor processors and other platform resources for efficient scheduling and performance management purposes. While current architectural support works well in monitoring single application/single core scenarios, this is not the case for multiprocessor systems. That is, newer systems that include multi-core chip multiprocessors (CMP) on platforms having shared resources cannot be sufficiently and accurately monitored.

In CMP platforms applications/virtual machines (VMs) running simultaneously can interfere with each other because of resource contention. OS/VMM execution environments presently do not have any information about either interference or sharing between these disparate threads of execution, leading to sub-optimal scheduling decisions and lower overall performance.

Also, a user often may have a priority associated with the tasks running on the platform. Typical systems can control only the time an application has available on a core, without any control of the other shared resources such as cache or memory bandwidth.

DETAILED DESCRIPTION

Various use models may benefit from accurate resource monitoring. For example, when multiple tasks are running simultaneously on a CMP platform they may interfere with each other because of resource contention. Monitoring cache resource utilization at the application/VM level may enable the OS/VMM to perform optimal scheduling based on occupancy, inter-application sharing and interference. For example, the scheduler can decide to move applications/VMs to reduce interference, increase sharing and schedule high priority applications for minimum interference effects. From a user's point of view, one task is often more important than another. Some platforms may include a so-called platform quality of service (QoS) register that can be used to indicate the priority of the task. Based on this information, resource partitioning mechanisms may be implemented to improve the quality of service to the user-preferred application. Still further, another use model driving resource monitoring is metering and chargeback. With the increasing use of virtualization in hosting data centers, VM level resource monitoring may be used to implement a pay as you go system, which is based on the VM level resource utilization.

To enable embodiments, thread information may be communicated to a last level cache (LLC). In some embodiments, this thread information may include a thread identifier (thread ID) and an application/VM priority. Using this information, memory requests may be tagged with the current priority level. In some implementations, the identifier information may correspond to an Application Specific ID (ASID) or a Virtual Processor ID (VPID), and may be used for application/VM level tagging of memory accesses generated by the corresponding application or VM. This ASID/VPID and/or a mapped priority level of the running application may be communicated to the platform by the scheduling entity. Once the tagged memory access reaches the LLC, the requested line in the cache may be tagged with the ASID/VPID of the requester. Once tagged, the monitoring of cache space usage can be accomplished by various counter mechanisms such as global counters. In this way, these global counters maintain the cache occupancy, interference and sharing per application/VM, which can be used to manage cache utilization based on this information.

Figure 1:
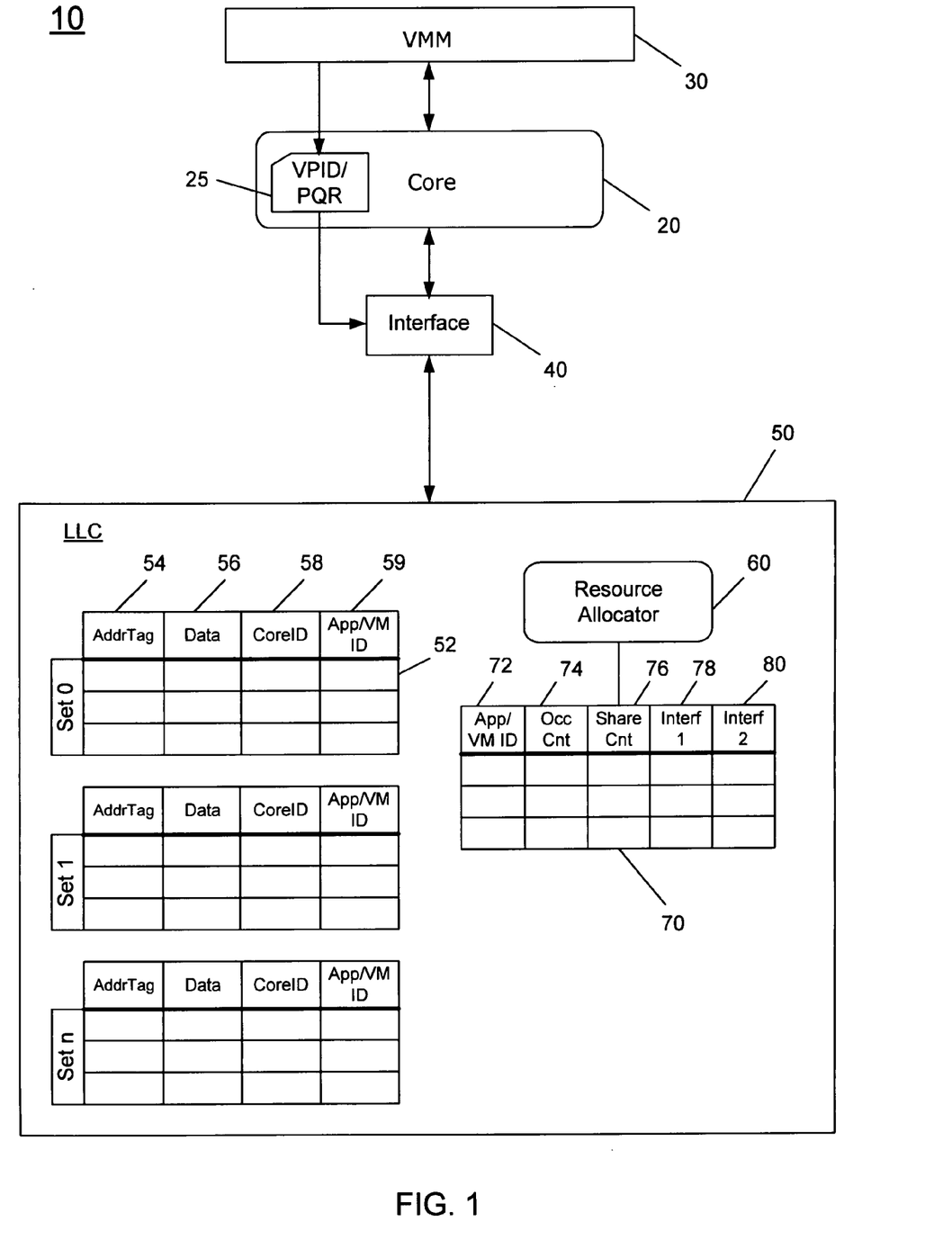
FIG. 1 is a block diagram of a system in accordance with an embodiment of the present invention.

Referring now to FIG. 1, shown is a block diagram of a system in accordance with an embodiment of the present invention. As shown in FIG. 1, system 10 is shown in the context of a VM implementation, although in other embodiments an OS-based system that provides QoS support on an application level may be used. As shown in FIG. 1, a processor core 20 is present. While shown with only a single such core in the embodiment of FIG. 1, understand that embodiments may be used with multi-core processors. Each such core 20 includes various state storage structures such as machine status registers, control and configuration registers, and a platform quality of service register (PQR) 25, among others. In various embodiments, a priority of a current application/VM may be stored in PQR 25 and provided to an interface 40 such as a fill buffer or a bus interface unit, which may be part of processor 10 used to interface between core 20 and a last level cache (LLC) 50. As shown, priority information and/or a thread identifier is provided from PQR 25 to interface 40. In this way, as core 20 provides memory requests to interface 40, interface 40 can tag the requests that are sent to LLC 50 with the given VPID/ASID bits and/or quality of service (QoS) or priority bits. As further shown in FIG. 1, a VMM 30 may be present and in communication with core 20. VMM 30 may manage one or more virtual machines and provide information to PQR 25 regarding priority of the virtual machines. In various implementations, VMM 30 may include a scheduler to schedule requests of VMMs on various hardware resources, including core 20.

Referring still to FIG. 1, cache 50 may be arranged as an M-way N-set cache. As shown in FIG. 1, cache 50 includes a plurality of sets zero-N each including a plurality of cache lines 52 (i.e., corresponding to ways zero-M). As shown, each cache line includes an address tag portion 54, a data portion 56, a core indicator portion 58 and an identifier portion 59. In various embodiments, identifier portion 59 may identify, e.g., a VPID or ASID with which the cache line is associated. Still further, in some implementations identifier portion 59 may include a priority level of the associated virtual machine or application associated with the cache line. Address tag portion 54 may store a portion of a virtual address or other tag information and data portion 56 may store data of the cache line, while core indicator 58 may indicate a given core with which the data is associated.

Referring still to FIG. 1, a resource allocator 60 within cache 50 may be present and may perform resource allocation with respect to cache 50 on the basis of fine-grained utilization information as determined by a metadata or utilization storage unit 70. As shown in FIG. 1, utilization storage unit 70 may include various entries, each associated with a given application/VM. Thus each entry may include an identifier portion 72 to identify the corresponding virtual machine and/ or application associated with the various counters present in each entry. Specifically, each entry includes an occupancy counter field 74, a sharing counter field 76, a first interference counter field 78 and a second interference counter field 80. In one embodiment, first interference counter field 78 counts the number of times the counting application evicted another line, while second interference counter field 80 counts the number of time other applications evicted the counting application. In turn, sharing counter 76 may count the number of hits to the line from applications other than the counting application. Thus the information in utilization storage unit 70 may include information regarding inter-application/VM interaction with regard to given cache lines. While the example shown in FIG. 1 includes sharing or interference-based interaction, understand the scope of the present invention is not limited in this regard.

In some embodiments, the interference and sharing information can also be maintained for every pair of threads or applications or VMs by storing an N×N matrix, where N is the number applications/VMs. Based on the information stored in the various entries of utilization storage unit 70, resource allocator 60 may dynamically control allocation of cache resources to the various applications/VMs. While shown with this particular implementation in the embodiment of FIG. 1, understand the scope of the invention is not limited in this regard.

Once the cache lines are tagged with VPID/ASID information, the counters in utilization storage unit 70 can be updated when an allocation/replacement is carried out. For example, an entry associated with an incoming line is incremented and the entry associated with the line evicted is decremented.

Based on the information thus present in utilization storage unit 70, performance management, performance enforcement as well as metering/chargebacks may be performed. For example, for performance management, information from the counts present in utilization storage unit 70 may be provided to a software scheduler such as an OS or VMM. Based on this cache resource utilization information, the scheduler may perform optimal scheduling based on occupancy, inter-application sharing and interference. Accordingly, the scheduler may reschedule applications/VMs to reduce interference and increase sharing. Still further, embodiments may use the information to provide for performance enforcement. For example, the same information provided to the scheduler may cause the scheduler to send control information back to LLC 50, and more particularly to resource allocator 60, to provide limits or access restrictions on certain applications/VMs. For example, to enforce a user's desired priority, a higher priority application may have unrestricted usage of storage within LLC 50, while a second, lower priority application that is determined to interfere with the first application, may have restricted access or usage of LLC 50. Still further, based on the information provided from utilization storage unit 70, applications or VMs of different clients executed on a host data center platform may be limited in the amount of access to LLC 50 or such execution may trigger charges to the client associated with the application/VM.

Thus in various embodiments application/VM level cache space utilization may be monitored using request tagging, and cache line tagging. In some embodiments, accurate monitoring of the utilization may occur at application/VM level, although a certain amount of overhead may be needed. In other embodiments, a set sampling mechanism may be used by which the implementation overhead is reduced considerably, without much degradation in accuracy. That is, while a structure such as that shown in FIG. 1 may provide for most accurate monitoring, a certain space overhead required for the extra bits. Assuming support for at least 64 VMs/applications, and using only 6 bits for identification information, more VMs/applications can be supported by bucketing or remapping of the active monitoring VMs. Assuming 6 bits are used for tagging of a 64 byte cache line, the overall cache space overhead can be computed as 1.2%. Thus in other embodiments, a set sampling mechanism may be implemented instead.

The philosophy behind set sampling is that a subset of sets is a good representation of the whole cache. Since the cache is organized into multiple sets and ways inside sets, accesses may be distributed somewhat randomly to sets. This makes a small subset of sets a good representation of the whole cache. This property may allow reducing the overall space overhead and providing accurate enough monitoring results. In some embodiments, a very small subset (e.g., less than 10% of sets) may be sufficient to yield 95% accuracy. With 10% of sets the cache space overhead for 6 bit monitoring support is only 0.12%. The sets of the subset thus act as so-called cache scouts to provide application/VM level information regarding cache usage.

Figure 2:
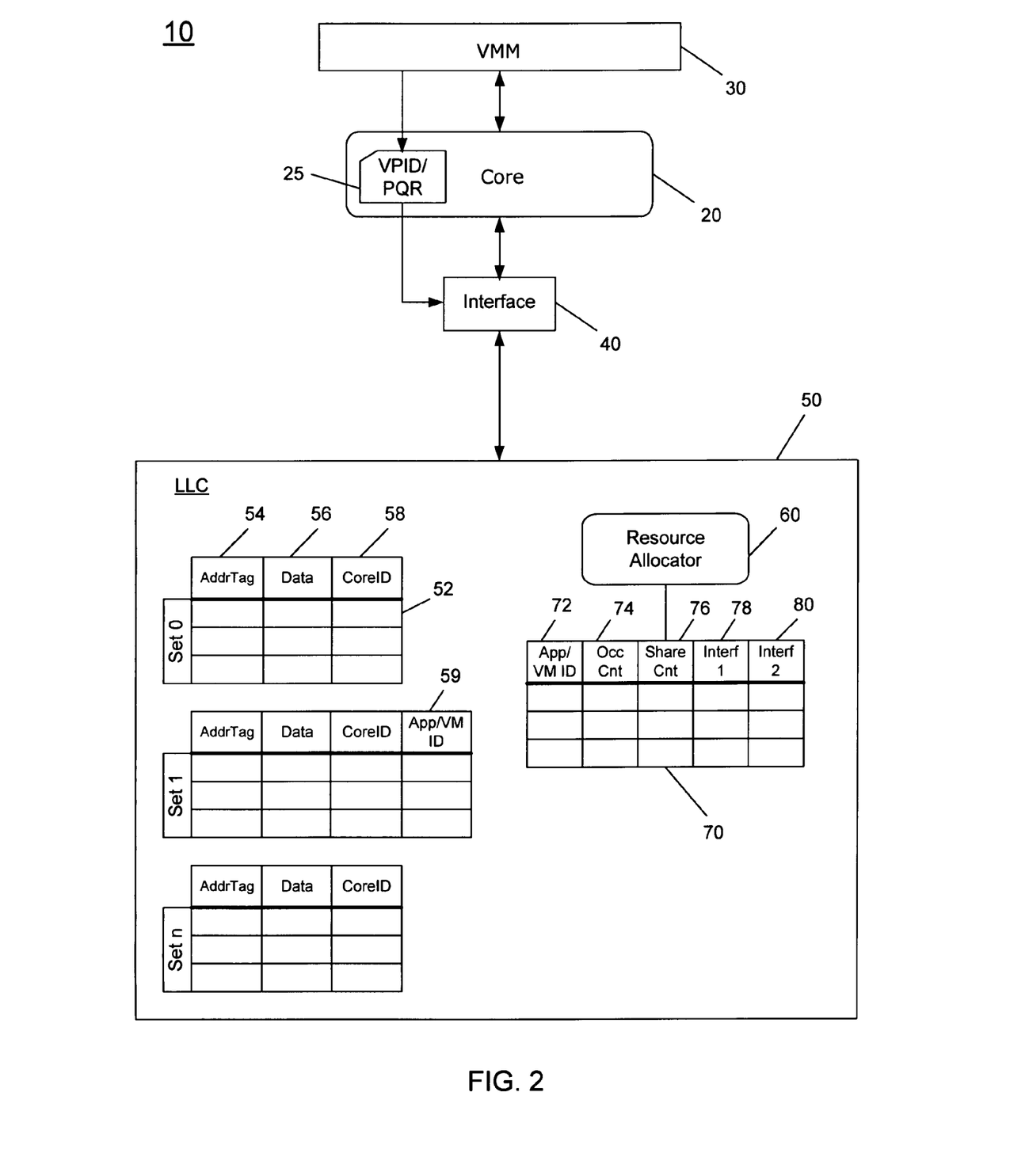
FIG. 2 is a block diagram of a system in accordance with another embodiment of the present invention.

Thus in some implementations only a subset of sets within a cache may include identifier tagging in accordance with an embodiment of the present invention. Thus as shown in FIG. 2, only set one includes an identifier portion 59. Thus in an implementation such as that shown in FIG. 2, set sampling may be performed to provide reasonably accurate cache utilization information with reduced overhead. Furthermore, note that embodiments implementing set sampling may further limit the information provided to utilization storage unit 70 only to those cache lines associated with a sampled set, i.e., a cache line including VPID/ASID tag information. While shown with this particular implementation in FIG. 2, the scope of the present invention is not limited in this regard.

Thus in contrast to hit-miss counters which do not provide any insight into the space utilization of multiple simultaneously running applications, embodiments may accurately monitor application/VM usage on a per agent basis. Further, embodiments provide information about the sharing or interference effects between applications or VMs. Using this information about cache utilization, better performance management by OS/VMMs and/or a resource allocator of a cache may be realized whether for hardware supported QoS enforcement or software controlled performance management in terms of smart scheduling. Still further, embodiments may provide information about the cache resource utilization for metering and chargeback in hosting service use models.

Embodiments may also bias cache lines with respect to a replacement policy. Caches typically rely on various approximations of a Least Recently Used (LRU) algorithm. These pseudo LRU (pLRU) algorithms maintain limited state information per line, updated on a per access basis. Upon the need for eviction, pLRU algorithms attempt to replace a cache line that has not been recently used. The largest weakness of these algorithms is that they lack knowledge of the relative locality between lines and eviction decisions are made solely on recent access patterns. The fundamental property to exploit with cache line biasing is the asymmetric use of the address space by software. Here we present two types of asymmetry as illustrative examples, although the use of biasing is not limited to these examples.

The first type of asymmetry is the high concentration of cache misses in a small region of the address space. Object-oriented programs running on a virtual machine rely on an automatic memory management system (garbage collection) to handle the dynamic allocation and reclamation of memory. The best performing collectors often consolidate new allocations in one region of the address space and subsequently migrate surviving objects to another. A generational garbage collector is one such example and employs a nursery region for allocation of new objects. The second type of asymmetry found in many applications is the reuse of data in LLCs. First level caches filter out data reuse for short-term temporal locality. Only lines that sustain accesses over a larger period of time with significant accesses to other data interleaved will see reuse at lower levels of cache.

A virtual machine has information on where it will place new allocations. The nursery region, for example, is determined by the automatic memory manager and its location in the address space is known. The virtual machine has the information necessary to inform hardware about the asymmetric access pattern that will arise due to the behavior of the memory management algorithm. This information could be passed to the hardware in locality hints describing the address space location. These hints can be leveraged by hardware to bias the replacement policy in favor of the region where cache misses are likely to occur.

Software hints can be encoded in no operation (NOP) instructions that do not affect the functional correctness of an application. A compatible hardware platform that simply ignores the hints would be a valid implementation. However, a hardware implementation that leveraged information provided by software could potentially enhance the runtime performance of the application by anticipating the cache demands and more effectively managing cache resources. Thus a hint mechanism may encode locality information for a region of moderate size (e.g., 4 kilobytes (KB)) and a specified access pattern. The patterns could consist of information such as: (1) accesses are likely to occur here in the near future; (2) data from this region is going to be streamed and thus likely only used once; or (3) this region is likely to receive repetitive accesses. A software hint mechanism provides an explicit way of communicating information about future behavior from the software level to the hardware level.

Hardware also has the ability to detect some asymmetry without software notification. In the presence of line reuse, the hardware can select to bias and avoid displacing reused data with data that is streaming. This has implications in the context of single processor systems where interleaved access patterns exist in a single program, and to multiprocessor systems with shared caches. A streaming program has the potential to displace data in a program that has high reuse. This asymmetry can be exploited by simply negatively biasing lines that are first allocated (misses) and positively biasing lines that are accessed again (hits).

To support biasing at the hardware level embodiments may provide a replacement policy to treat lines in different ways. The following description is one example implementation of cache-line biasing that can be easily integrated into a standard pLRU algorithm in common use. One common pLRU cache replacement policy tracks Most Recently Used (MRU) status by performing updates to the corresponding nodes in a tree structure. Every access causes updates to all nodes in the path to the cache line in the set that receives the access. Upon the need for eviction, the tree is traversed using the inverse of the node values to select a victim that was not recently used. This hardware policy treats all accesses equivalently and updates all levels in the tree for every access.

Based on the assumption that not all accesses are equivalent, in the presence of priority among lines the hardware biases victimization in favor of lower priority lines. A highest priority access may perform a full update to a tree structure while a lower priority access may be restricted to a partial update to the tree for an 8-way associative cache as in FIG. 3.

Figure 3:
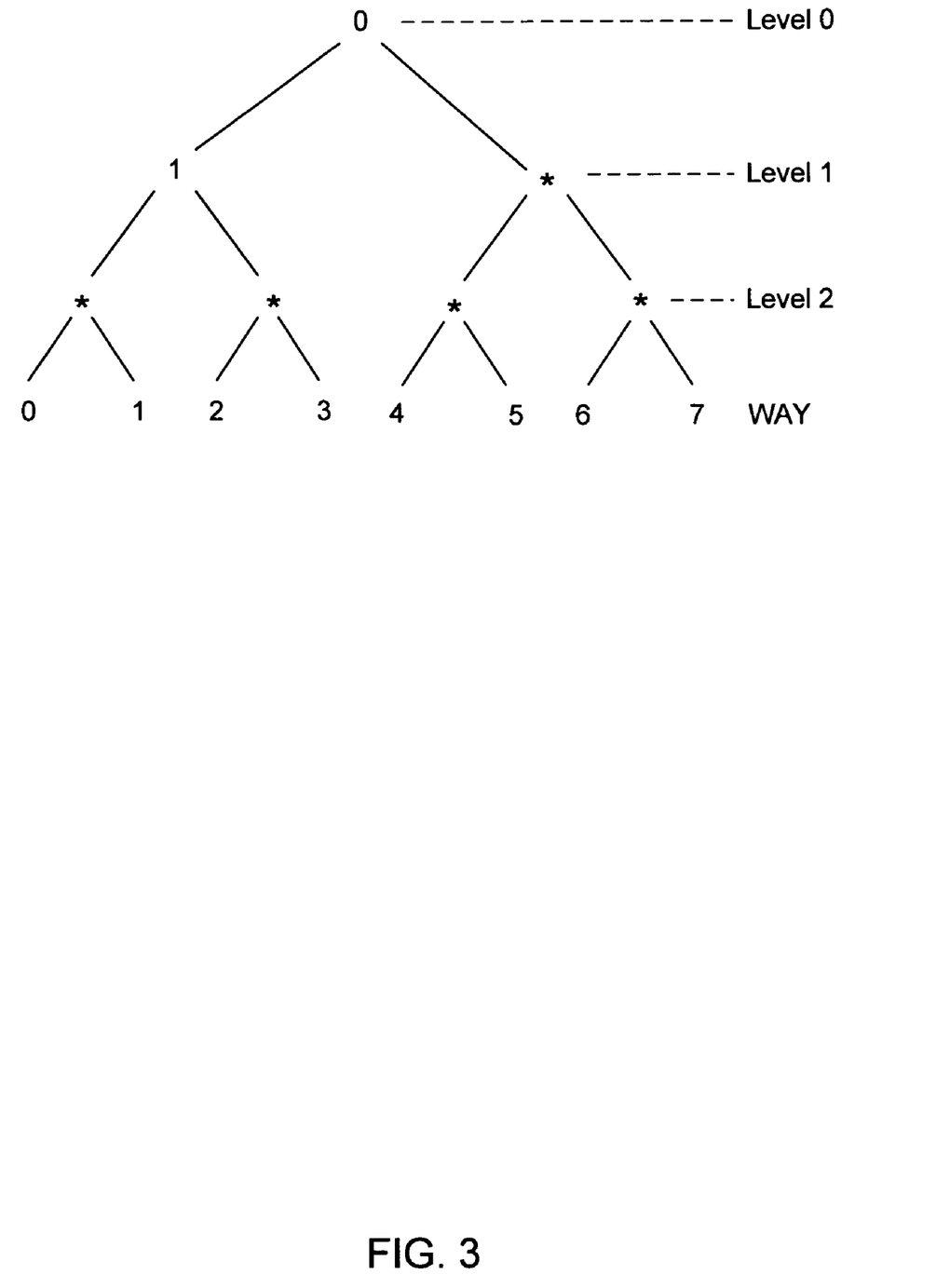
FIG. 3 is a flow diagram of an update to a tree structure in accordance with one embodiment of the present invention.

A partial update will ensure that a recently accessed low priority line is not victimized immediately, but the line is not promoted all the way to MRU status. In the extreme case, a lowest priority access can perform no update to the tree and a subsequent miss will evict the line.

This same biasing technique can be also applied to shared caches in multiprocessor environments with no impact on coherency. In a multiprocessor environment, dynamic scheduling of disparate processes can render ineffective many compiler optimization techniques that target optimal cache usage. Static compilation of a program has no possible information on the dynamic behavior of a system at runtime with respect to resources shared between multiple processes.

Embodiments may also perform prefetching that combines aspects of software prefetching and hardware prefetching. Current software prefetching is handled on an individual load basis and is repeated to prefetch multiple cache lines. Current hardware prefetching automatically brings in lines based on simple patterns such as strided accesses.

The granularity of software prefetching may be coarsened to provide hardware with a pattern to enhance the hardware prefetch engine while reducing the software overhead. A hardware prefetch engine driven by software hints has several potential advantages over currently available prefetch mechanisms. First, a hint driven approach allows prefetches to be initiated sooner than in a hardware only scheme. Hardware relies on a prediction mechanism which requires detection of a pattern in a set of misses introducing a startup lag. Complicated patterns such as multi-strided accesses, although many are detectable by hardware, require additional detection time. Second, as hardware prefetch engines for second level caches and below, rely on address stream information (i.e., no access to program counter, etc.), hardware can practically deal with patterns only within individual physical pages, and restart detection when accesses cross page boundaries. A software hint mechanism is capable of supplying hardware with the necessary information to cross page boundaries and sustain prefetching during those transitions. Third, a software hint mechanism can ensure that the hardware maintains prefetch operations for selected streams regardless of noise in the address stream. A purely random set of accesses intermixed in an address stream could potentially thrash a hardware prefetch detection scheme. Reserving some resources for software directed hardware prefetching could ensure that certain streams are always prefetched even in the presence of excessive noise.

The asymmetric pattern regarding the high concentration of write misses to the nursery is one potential candidate for such a hardware prefetch mechanism driven by software hints. The software could provide the same type of hints used for cache line biasing to a prefetch engine that will bring in multiple cache lines for the targeted allocation region.

Another approach that may be employed is to automatically detect such patterns in hardware and perform the prefetches without software notification. The high miss rate to the nursery is due to write misses. This pattern could be detected in hardware by monitoring write misses, normally an infrequent occurrence.

Figure 4:
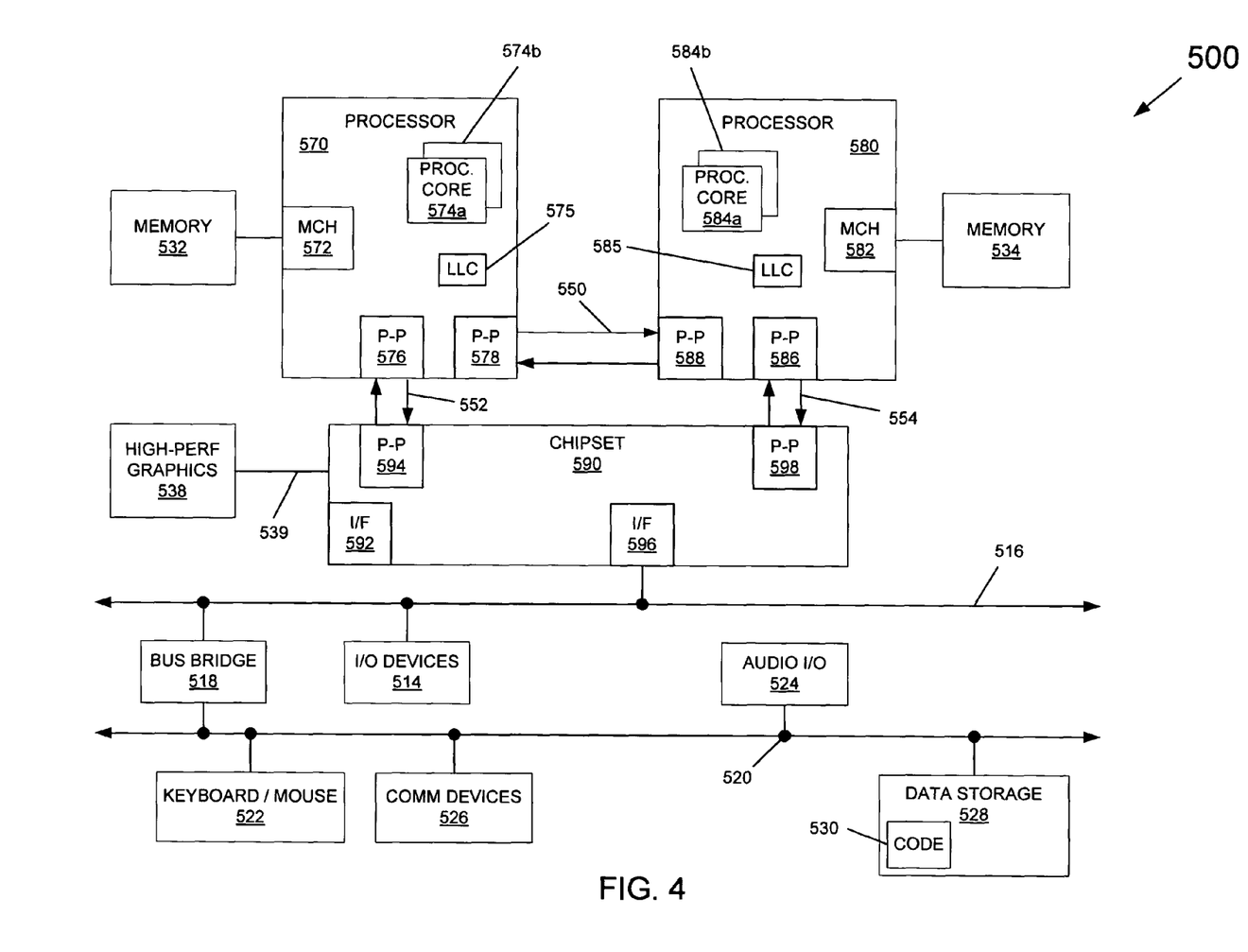
FIG. 4 is a block diagram of a multiprocessor system in accordance with an embodiment of the present invention.

Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. Furthermore, as shown in FIG. 4 a last-level cache memory 575 and 585 may be coupled to each pair of processor cores 574a and 574b and 584a and 584b, respectively, and may include a resource allocator to control utilization based on monitoring of application VM-level information in a monitor storage within the LLCs, in some embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 or a point-to-point interconnect may be used to couple graphics engine 538 to chipset 590. In turn, chipset 590 may be coupled to a first bus 516 via an interface 596.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    associating a first identifier with data stored by a first agent in a cache line of a last level cache (LLC) to indicate the identity of the first agent, and storing the first identifier with the data in the cache line, wherein the first agent is a first virtual machine (VM) corresponding to a first virtual machine monitor (VMM) or a first user level application; and
    updating at least one of a plurality of counters associated with the first agent in a metadata storage in the LLC, the counter including information regarding inter-agent interaction with respect to the cache line, wherein the plurality of counters include a share counter corresponding to a count of cache lines in the LLC associated with the first agent that have been used by a different agent.

2. The method of claim 1, wherein the plurality of counters include a first interference counter corresponding to a number of times that the first agent has caused an eviction of a cache line in the LLC associated with a different agent and a second interference counter corresponding to a number of times a cache line in the LLC associated with the first agent has been evicted by a different agent.

3. The method of claim 2, further comprising receiving the first identifier in the LLC from an interface coupled between a core and the LLC, wherein the interface is to receive the first identifier from a platform quality of service register (PQR) of the core, and controlling utilization of space in the LLC based on information in the metadata storage.

4. The method of claim 1, further comprising storing the first identifier in the cache line if the cache line is present in a set of a subset of cache sets which are to include identifier tag information, otherwise not storing the first identifier in the cache line.

5. The method of claim 1, further comprising biasing selection of a lower priority line for replacement instead of a higher priority line, based on priority information provided by a software hint.

6. An apparatus comprising:
    a plurality of processor cores each to independently execute instructions; and
    a last level cache (LLC) coupled to the plurality of processor cores, the LLC having a plurality of sets each including multiple cache lines, at least one of the sets having cache lines that include an identifier field to store an identity associated with an agent that requested storage of data in the cache line, the LLC further including a metadata storage to store a plurality of entries each having a plurality of count fields including a share counter field to store a count of cache lines of the associated agent in the LLC that have been used by a different agent, each of the entries associated with a different agent, each of the different agents corresponding to a virtual machine (VM) or a user-level application.

7. The apparatus of claim 6, wherein only a subset of the sets have cache lines that include the identifier field.

8. The apparatus of claim 6, further comprising a virtual machine monitor (VMM) coupled to one of the plurality of processor cores to provide the identity to a platform quality of service register (PQR) of the processor core, wherein the LLC is to receive the identity from an interface coupled to receive the identity from the PQR.

9. The apparatus of claim 8, wherein the apparatus comprises a multiprocessor system including the plurality of processors cores each having the PQR.

10. The apparatus of claim 6, wherein the plurality of count fields further includes a first interference count field to store a number of times that the associated agent has caused an eviction of a cache line in the LLC associated with another agent and a second interference count field to store a number of times a cache line in the LLC of the associated agent has been evicted by another agent.

11. The apparatus of claim 6, wherein the LLC further comprises a resource allocator to bias selection of a lower priority line for replacement instead of a higher priority line, based on priority information provided by a software hint.

12. A system comprising:

a core;

a cache memory coupled to the core via an interface, the cache memory including a plurality of cache lines and a metadata storage to store a plurality of entries each having a plurality of count fields, each of the entries associated with a different agent and including a share counter field to store a count of cache lines of the associated agent in the cache memory that have been used by a different agent, each of the different agents corresponding to a virtual machine (VM) or a user-level application.

13. The system of claim 12, wherein the plurality of count fields further includes a first interference count field to store a number of times that the associated agent has caused an eviction of a cache line in the cache memory associated with another agent.

14. The system of claim 13, wherein the plurality of count fields further includes a second interference count field to store a number of times a cache line of the associated agent in the cache memory has been evicted by another agent.

15. The system of claim 12, wherein the cache memory further comprises a resource allocator to bias selection of a lower priority line for replacement instead of a higher priority line, based on priority information provided by a software hint.

16. The system of claim 12, wherein the cache memory is to perform a full update to a tree structure corresponding to a plurality of nodes for a high priority access and to perform a partial update to the tree structure for a low priority access.

17. The system of claim 16, wherein the cache memory is to prevent an update to the tree structure for a lowest priority access.

* * * * *